Patented Sept. 29, 1942

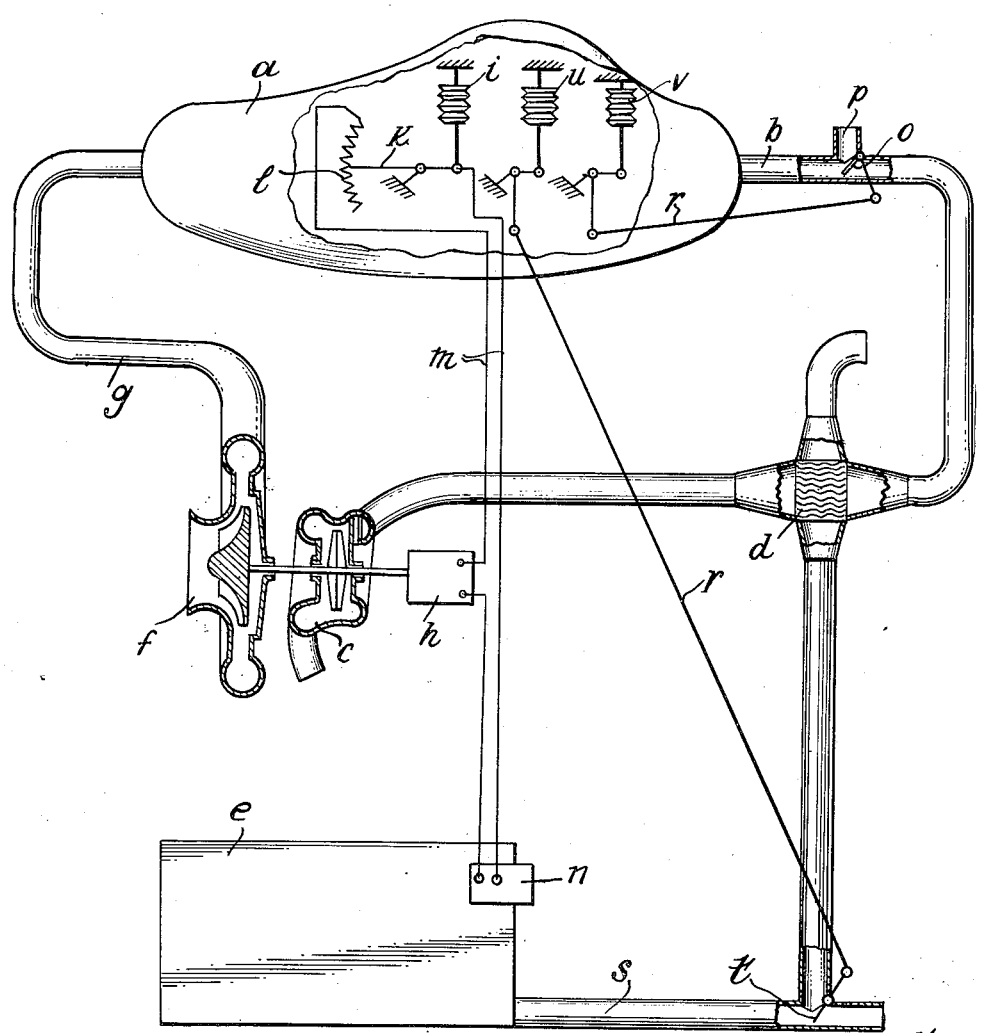

2,297,495

UNITED STATES PATENT OFFICE 2,297,495

VENTILATION OF ALTITUDE CABINS, IN PARTICULAR FOR AIRCRAFT

Hans Pfau, Berlin-Adlershof, Germany; vested in the Alien Property Custodian

Application May 14, 1940, Serial No. 335,151
In Germany May 15, 1939

9 Claims. (Cl. 128—204)

It is known to provide airplanes, destined to travel at great altitudes, with altitude cabins, in which the occupants are subjected to a pressure higher than the atmospheric pressure. For that purpose special compressors were provided to compress the atmospheric air to the extent of the pressure prevailing in the chamber or cabin. Through this step a greater flying weight is obtained, which will reduce the efficiency of the airplane. In order to cover the power necessary for said compressors from sources of energy existant but not yet utilized, it has been suggested to recover such compression work, considered from the thermo-dynamical view-point, wholly or partly through the expansion work of the exhaust air. This was done in such a manner, that the exhaust air from the cabin was conveyed to a turbine utilising the expansion work. Said turbine as is known, drives a compressor, which admits the newly induced or drawn in fresh air to the interior of the said cabin. Owing to the losses attendant to said operation, the output of the turbine will not be sufficient of course, in order to produce the driving force required for the said compressor. As is known, therefore, for the increase of the efficiency of the exhaust air, a heat exchanging device was arranged between the altitude cabin and said turbine, which device was passed through by the exhaust gases of the normal internal combustion engine.

Now it is possible by a more or less intensive pre-heating of the turbine air, to render its efficiency of varying magnitude. If the efficiency of the turbine is so proportioned, that it is greater than that of the compressor, it is possible according to the invention to change the number of revolutions of the turbine through the admission or withdrawing of air at or ahead of the turbine by means of known valves or the like, or through a pre-heating of the turbine air to a varying intensity, or through a controllable heat exchanging device known per se, but to control it according to the desired pressure in the interior of the cabin.

Now according to the invention it is suggested with arrangements of this kind, to render the output of the turbine smaller, through pre-heating, than the efficiency which the compressor must take up, and to produce the difference through a controllable electrical engine. By means of a control known per se the output of said electrical engine is so adjusted, that the quantity of air supplied by the compressor will produce in the altitude cabin the desired pressure, which for instance may lie near that prevailing on the ground.

An arrangement according to this invention is illustrated by way of example in the drawing.

The altitude cabin $a$ communicates by means of a pipe-line $b$ with an air turbine $c$. In this course a heat-exchanging device $d$ is inserted, which is heated by the exhaust gases of the internal combustion engine $e$ coupled with the propeller. The air turbine is connected to a compressor $f$, drawing in air from the atmosphere, compressing the air and forcing it by way of the conduit $g$ into the altitude cabin $a$. To this engine aggregate $c, f$ is connected in addition an electrical engine $h$, which is controlled in dependency upon the pressure in the altitude cabin $a$ in such a manner, that the internal pressure in the cabin will correspond with the desired internal pressure, for instance the pressure on the ground. The means for control comprise a pressure responsive device $i$, the impulses of which are transmitted by way of rods $k$ to a rheostat $l$. The latter is inserted in the electrical conduit $m$ ahead of the generator of current $n$ of the internal combustion engine. If now the air supplied by the compressor $f$ shows a pressure higher than that of the desired internal pressure, the pressure responsive device $i$ will adjust the electrical engine in such a way, that it will run at a lesser number of revolutions. In case the said compressor should produce a reduced pressure, the electrical engine will run in a corresponding sense at a higher number of revolutions.

The control of the number of revolutions of the turbine $c$ may also be effected in that the quantity of air supplied to the turbine $c$, is controlled. For that purpose a flap $o$ is inserted in the conduit $b$, which latter is provided at this point with an outlet $p$ to the atmosphere. Just according to the position of the said flap the air coming from the cabin $a$ will be admitted either entirely to the turbine $c$ or a part of the air is passed into the atmosphere through the outlet $p$. The control of the said flap is again effected through a pressure responsive device $v$ by way of rods $r$.

Finally it is also possible to effect the control of the turbine $c$ through a control of the pre-heating of the air admitted to the said turbine. For that purpose a flap $t$ is provided in the exhaust duct $s$ of the internal combustion engine.

Said flap is likewise controlled through a pressure responsive device $u$ by way of rods $r$. Just according to the position of the said flap more or less exhaust gases will pass through the heat exchanging device $d$, so that the pre-heating of the air admitted to the turbine $c$ and consequently the turbine proper is controlled.

I claim:

1. Arrangement for ventilating altitude cabins particularly in airplanes the requisite fresh air of which is supplied by a compressor actuated by a turbine operating on the exhaust air from said cabin, said arrangement including an engine aggregate and comprising in combination a cabin, conduits leading to and from the latter, and means for controlling the number of revolutions of the engine aggregate in dependency upon the desired internal pressure in the cabin.

2. Arrangement for ventilating altitude cabins particularly in airplanes, comprising in combination: a cabin, conduits leading to and from the latter, a turbine in said conduit from said cabin and operating on the exhaust air therefrom, and means for controlling the number of revolutions of the turbine by controlling the quantity of said exhaust air supplied to the said turbine.

3. Arrangement for ventilating altitude cabins particularly in airplanes, comprising in combination: a cabin, conduits leading to and from the latter, an engine aggregate comprising a turbine operating on the exhaust air from said cabin, and means for controlling the number of revolutions by a controllable electrical engine coupled to the engine aggregate.

4. Arrangement for ventilating altitude cabins particularly in airplanes, comprising in combination: a cabin, conduits leading to and from the latter, a turbine in said conduit from the cabin and operating on the exhaust air therefrom, a motor, and means for controlling the number of revolutions of the turbine by utilizing the exhaust gases of the motor through a varying heating of a heat exchanging device.

5. Apparatus for ventilating aircraft altitude cabins comprising in combination, a compressor for supplying fresh air to the cabin, means for driving said compressor comprising a turbine actuated by exhaust air from said cabin and an electric motor for supplying additional power, and means responsive to the pressure in said cabin for controlling the speed of said motor.

6. Apparatus for ventilating aircraft altitude cabins, comprising in combination, a compressor for supplying fresh air to said cabin, means for driving said compressor comprising a turbine actuated by exhaust air from said cabin, and means for controlling the supply of exhaust air from said cabin to said turbine and thereby controlling the speed of said compressor.

7. Apparatus for ventilating aircraft altitude cabins, comprising in combination, a compressor for supplying fresh air to said cabin, a turbine actuated by exhaust air from said cabin for driving said compressor, an electric motor coupled with said compressor, and means for controlling the speed of said motor.

8. Apparatus for ventilating aircraft altitude cabins, comprising in combination, a compressor for supplying fresh air to said cabin, a turbine actuated by exhaust air from said cabin for driving said compressor, means employing the exhaust gases of the aircraft motor for heating said cabin exhaust air, and means for controlling the speed of said compressor by varying the amount of heating of said cabin exhaust air.

9. Apparatus for ventilating aircraft altitude cabins, comprising in combination, a cabin having an inlet conduit for fresh air and an outlet conduit for exhaust air, power driven means for supplying fresh air through said inlet conduit means actuated by said exhaust air from said outlet conduit for supplying power for driving said fresh air supplying means, and means responsive to the pressure in said cabin for controlling the speed of said exhaust air actuated means.

HANS PFAU.